United States Patent [19]
Reilly

[11] Patent Number: 6,000,473
[45] Date of Patent: Dec. 14, 1999

[54] LOW DIFFERENTIAL CHECK VALVE FOR SPRINKLER SYSTEMS

[75] Inventor: William Joseph Reilly, Langhorne, Pa.

[73] Assignee: Victaulic Fire Safety Company L.L.C., Easton, Pa.

[21] Appl. No.: 09/080,878

[22] Filed: May 18, 1998

[51] Int. Cl.⁶ .............. A62C 37/08; A62C 37/10
[52] U.S. Cl. ................................. 169/17; 169/22
[58] Field of Search ................. 169/17, 19, 22; 137/527.8, 516.25, 556, 516.29; 271/175

[56] References Cited

U.S. PATENT DOCUMENTS

| | | | |
|---|---|---|---|
| 3,473,612 | 10/1969 | Poitras | 169/17 |
| 3,595,318 | 7/1971 | Merdinyan | 169/17 |
| 4,854,342 | 8/1989 | Polan | 137/516.29 |
| 5,295,503 | 3/1994 | Meyer et al. | 137/556 |
| 5,439,028 | 8/1995 | Meyer et al. | 137/556 |

*Primary Examiner*—Andres Kashnikow
*Assistant Examiner*—Davis Hwu
*Attorney, Agent, or Firm*—Abelman, Frayne & Schwab

[57] ABSTRACT

A low differential check valve is provided for a fire control system, having particular adaptability in a dry system. The check valve is maintained in its closed position by a latch which is controlled by a plunger. The plunger is activated, and moved to release the latch, upon the sensing of drop in system air pressure by a higher differential mechanism external of the check valve. The check valve may then be reset, with its clapper moved to its closed condition, without requiring internal access of the check valve to release a clapper latch.

24 Claims, 5 Drawing Sheets

LOW DIFFERENTIAL CHECK VALVE FOR SPRINKLER SYSTEMS

FIELD OF INVENTION

The present invention relates to a check valve intended for use in conjunction with a fire protection system. The fire protection system includes a plurality of individual sprinklers which are normally isolated from the pressurized water source by the check valve. The check valve of the present invention is particularly applicable for use in a dry type fire control sprinkler systems, in which the piping between the pressurized water source and individual sprinkler heads is normally void of water.

BACKGROUND OF THE INVENTION

Fire control sprinkler systems generally include a plurality of individual sprinkler heads which are usually ceiling mounted about the area to be protected. The sprinkler heads are normally maintained in a closed condition and include a thermally responsive sensing member to determine when a fire condition has occurred. Upon actuation of the thermally responsive member the sprinkler head is opened, permitting pressurized water at each of the individual sprinkler heads to freely flow therethrough for extinguishing the fire. The individual sprinkler heads are spaced apart from each other, by distances determined by the type of protection they are intended to provide (e.g. light or ordinary hazard conditions) and the ratings of the individual sprinklers, as determined by industry accepted rating agencies such as Underwriters Laboratories, Inc., Factory Mutual Research Corp. and/or the National Fire Protection Association. It should be well appreciated that once the sprinkler heads have been thermally activated there should be minimal delay for the water flow through the sprinkler head at its maximum intended volume.

In order to minimize the delay between thermal actuation and proper dispensing of water by the sprinkler head, the piping that connects the sprinkler heads to the water source is, in many instances at all times filled with water. This is known as a wet system, with the water being immediately available at the sprinkler head upon its thermal actuation. However, there are many situations in which the sprinkler system is installed in an unheated area, such as warehouses. In those situations, if a wet system is used, and in particular since the water is not flowing within the piping system over long periods of time, there is a danger of the water within the pipes freezing. This will not only deleteriously affect the operation of the sprinkler system, should the sprinkler heads be thermally actuated while there may be ice blockage within the pipes, but such freezing, if extensive, can result in the bursting of the pipes, thereby destroying the sprinkler system. Accordingly, in those situations it is the conventional practice to have the piping devoid of any water during its non-activated condition. This is known as a dry fire protection system.

While all fire protection sprinkler systems generally include a check valve for isolating the sprinkler system piping from the pressurized water source during the non-activated condition, the design of such check valves for a dry type fire control sprinkler system has presented various problems. The check valve, which is interposed between the system piping and pressurized water source, includes a clapper, which when it is in its closed operative condition prevents the flow of the pressurized water into the sprinkler system piping. The sprinkler piping in the dry fire protection system will include air or some other inert gas (e.g. nitrogen) under pressure. The pressurized air, which is present within the sprinkler system piping, is also presented to the check valve. Should one or more of the sprinkler heads be thermally activated to its open condition, the pressure of the air within the sprinkler system piping and check valve will then drop. The check valve must be appropriately responsive to this drop pressure, normally in opposition to the system water pressure also present in the check valve, to move the clapper to its open condition. When this occurs, it is desirable to have a rapid expulsion of the pressurized air within the check valve and the sprinkler system piping, to permit the rapid flow of the pressurized water through the open check valve, into the sprinkler system piping, and through the individual sprinkler heads to rapidly extinguish the fire.

The check valves intended for dry type fire control sprinkler systems have typically controlled the clapper movement by the water and the air pressure applied to its opposite sides. Such fire check valves include an air seal which opposes the pressurized water seal. To appropriately apply the system air pressure over the surface of the clapper air seal, a priming water level is oftentimes maintained within the check valve. During normal conditions, when no sprinkler heads have been activated, the two seals will be an equilibrium, thereby maintaining the clapper in its closed condition.

In order to increase the speed of check valve operation upon a drop off of the system air pressure, occasioned by the activation of one or more sprinkler heads, the system air pressure is normally applied to the clapper air seal over a substantially greater area then the water pressure is applied to the clapper water seal. This is known as a high differential type check valve. A problem of such valves is that should there then be a reduction in the system water pressure after the clapper has opened, and particularly since the pressure against the opposite (air) side of the clapper has been increased with the column of water that has flowed therethrough, there is a tendency of the clapper to reclose. Since the pressure applied against the air seal of the clapper will now be increased by the column of water extending upwards from the reclosed check valve, a greater water pressure would now be required to move the clapper to its open condition. Such disadvantageous reclosure, is referred to as a water columning effect. This could result in failure of the check valve to subsequently open should one or more of the sprinkler heads be thermally activated.

In order to avoid the reclosure of the clapper such prior art dry system check valves have generally been provided with a mechanical latch to maintain the clapper in its open condition once it has been activated. The inclusion of such a mechanical latch, while serving to prevent reclosure, disadvantageously requires the entire sprinkler system to be shut down and the interior of the high differential type actuator accessed to release the latch and reclose the clapper after the fire has been extinguished. Thus prior dry system check valves have typically required the main supply of water to be shut off, the water drained from the system, and then the high differential check valve opened to manually unlatch and reset the clapper. Recognizing the disadvantage of having to manually access the interior of the check valve a mechanism is shown in U.S. Pat. Nos. 5,295,503 and 5,439,028 which includes a reset linkage mechanism attached to the check valve, and actuated by the rotation of an externally accessible handle. As can be well appreciated such a mechanism adds to the size, cost and complexity of the check valve.

SUMMARY OF THE INVENTION

The check valve of the present invention includes flexible air and water pressure seals for the clapper which are in radial proximity, such that there is a minimal differential area for the application of the air and water pressure to the clapper. This is referred to as a low differential check valve. The clapper is maintained in its closed operative condition by a latch which has a release means which, while responsive to the drop in system air pressure, is actuated by a unit which may be independent of the actual pressure differential being applied at the clapper for maintaining the clapper in equilibrium. The latch release means is operative by a high differential mechanism, such as is the subject of U.S. patent application Ser. No. 09/080,879, filed on even date herewith, in the names of William J. Reilly and Philip M. Thomas and entitled Actuator for Check Valve. That actuator for the latch release mechanism in the check valve is rapidly responsive to a predetermined drop of the pressure within the sprinkler system piping. It will then be activated to release the latch which maintains the clapper of the check valve in its closed condition. By virtue of the low differential nature of the seals provided in the check valve of the instant invention and their flexible construction, increased tolerances and a certain degree of clapper movement is permitted without losing the clapper seal. Thus should there by a sudden increase in the water pressure, such as a "water hammer", the permitted movement of the low differentials flexible seals about the clapper will not result in the movement of the clapper to the open condition. Accordingly, the check valve of the present invention is substantially forgiving, and will maintain the seal integrity even should there may be some minor movement of its parts. This has allowed the check valve of the present invention to be rated at substantial higher pressure the previously existing check valves. For example, the check valve of the present invention may be safely being used in systems having a water pressure in the order of the 300 psi, where prior check valves where typically rated for use with a maximum pressure of 175 psi.

As a further advantage of the present check valve, since the seal on the air side of the clapper is not of a substantially greater area than the water seal, the overall size and weight of the check valve is substantially less then prior check valves which may have been intended for similar systems. Typically, the present check valve may be in the order of one half the overall volume one half to one third the weight of prior check valves intended for comparable systems. In addition to the cost savings achieved by the use of a less materials, the present check valve permits easier installation, since it can be readily handled by one individual, and may be installed at locations which could not readily accommodate previously available larger check valves.

More specifically the present invention provides a check valve, having particular utilization in conjunction with a dry fire control sprinkler system in which the system piping is normally devoid of water, and includes pressurized air (or other inert gas). The check valve comprises a housing which has an outlet at one end which is connected to the pressurized air of the fire control sprinkler system. The opposite end of the check valve has an inlet which is connected to the source of pressurized water. A chamber is provided between the water inlet and air outlet, with a clapper being at the juncture of the chamber and water inlet. The clapper will have a closed operative condition during which time it isolates the chamber, and hence the sprinkler system piping, from the pressurized water source, and an open operative condition in which it is moved away from the juncture, and allows the pressurized water to freely flow through the chamber and into the sprinkler system piping. A seal is provided for the clapper which include cooperating flexible pressure seals, of minimal differential area. The pressurized air is applied against one of the seals, and pressurized water against the other seal. A latch is provided to maintain the clapper in its closed condition. A latch release means, which operates independent of the differential pressure being applied at the clapper seals operates to release the clapper latch, thereby permitting movement of the clapper to its open condition, upon the sensing of a predetermined variation in the system air pressure. The latch release mechanism which permits movement of the clapper to its open operative condition is independent of the differential pressure being applied to the opposed clapper seals and includes a high differential sensor. The clapper seals are preferably annular flexible seals provided by the cooperative engagement of a unitary and uniquely shaped flexible diaphragm and a rigid platform of the check valve housing. The diaphragm includes an outermost flap which has opposed upper and lower surfaces. The rigid platform of the check valve housing includes an upwardly projecting annular ridge which mates with the lower surface of the diaphragm outermost flap to provide the air seal. The water seal is provided by a projecting ridge of the diaphragm which is at the inner extent of the diaphragm flap, and hence in close proximity thereof. An annular gap is provided above the diaphragm ridge, with the rigid platform including an annular surface inward of the annular ridge and opposite the downwardly projecting ridge of the diaphragm to provide the water seal. The air and water seal preferably straddle a plurality of atmospheric openings which are circumferentially spaced about the rigid platform. When the clapper is moved to its opened condition the pressurized water, in addition to flowing through the chamber and into the sprinkler system piping, will also flow through the atmospheric openings. The atmospheric openings are advantageously connected to a water responsive alarm system which provides an audible single that the sprinkler system has been activated.

The latch release means for the clapper preferably includes a piston assembly that has an output shaft. The output shaft is moved between first and second operative condition, with the first operative position characterized as the shaft engaging the clapper latch means for maintaining the latch means in its first position such that the clapper will be maintained in its closed operative position. The second operative condition of the shaft, which occurs responsive to a predetermined differential between the pressurized air and the pressurized water which is sensed at a location away from the clapper, moves the shaft to its second position. This releases the latch and permits the clapper to move to its open operative condition.

After the unit has been activated and the fire extinguished with the open sprinkler heads replaced, the clapper may then be conveniently and easily reset to its closed condition by sequentially changing the magnitudes of the pressurized air and pressure water without requiring internal accessing of the check valve housing, or a complex arrangement of auxiliary linkage mechanisms to move the clapper. More specifically the water supply is turned off to both the check valve and latch release mechanism, and the system is drained. The clapper, with its diaphragm will then automatically come down as air is replaced in the system. The main water supply is then opened with water supplied through the piston of the latch release mechanism to latch the clapper in its closed condition. Thus the low differential design of the flexible air and water seals in the check valve in the system of the present invention allows the check valve to be self resetting without requiring manual access to the interior thereof for the release of mechanical latch, as has been typically necessitated by prior check valves intended for dry fire control systems. Further, the positive latching of the mechanism uses the supply water pressure to hold the clapper shut. The supply water pressure on the latch is controlled by a relatively low system air pressure. When the system air pressure is released, such as resulting from an open sprinkler head, the decreasing air pressure as sense by the actuator mechanism which is the subject of aforementioned Application Ser. No. 09/080,879 entitled Actuator for Check Valve, releases the latch mechanism within the check valve, allowing the clapper to move to its open operative condition. Further the low differential design of the check valve seals is not readily subject to water columns, which would negative its subsequent operation.

It is therefore a primary object of the present invention to provide an improved check valve, having particularly utilization in conjunction with dry fire control systems.

Another object of the present invention is to provide a check valve in which the air and water pressure is applied to the clapper seals with minimal differential area between the air and water seals.

A further object is to provide a check valve in which the clapper is maintained in its closed position by a latch, which is released by a mechanism, responsive to a variation in system air pressure, as sensed at a location away from the clapper.

Yet a further object of the present invention provides such a check valve which includes a low differential seal provided by a pair of flexible seals about the outer periphery of the clapper, which will permit a desired degree of clapper movement while maintaining the air and water seals to keep the clapper is maintained in its closed condition.

Yet another object of the present invention is to provide such a check valve which, after activated, permits the clapper to be reset to its closed condition without requiring manual access to the inner chamber of the check valve.

Yet an additional object of the present invention is to provide such a check valve in which the clapper is non-latched in its open operative condition, and, after system operation, can be automatically reset to its closed operative condition by sequentially changing the magnitudes of the pressurized air and water applied to the check valve and its associated controls.

Still another object of the present invention is to provide such a check valve which may be of substantially lesser size and weight than previously available check valves for comparable systems, and can safely accommodate higher system water pressures.

These as well as other objects of the present invention will become apparent upon a consideration of the following detailed description and drawings.

DETAILED DESCRIPTION OF PREFERRED EMBODIMENT

Figure 1:
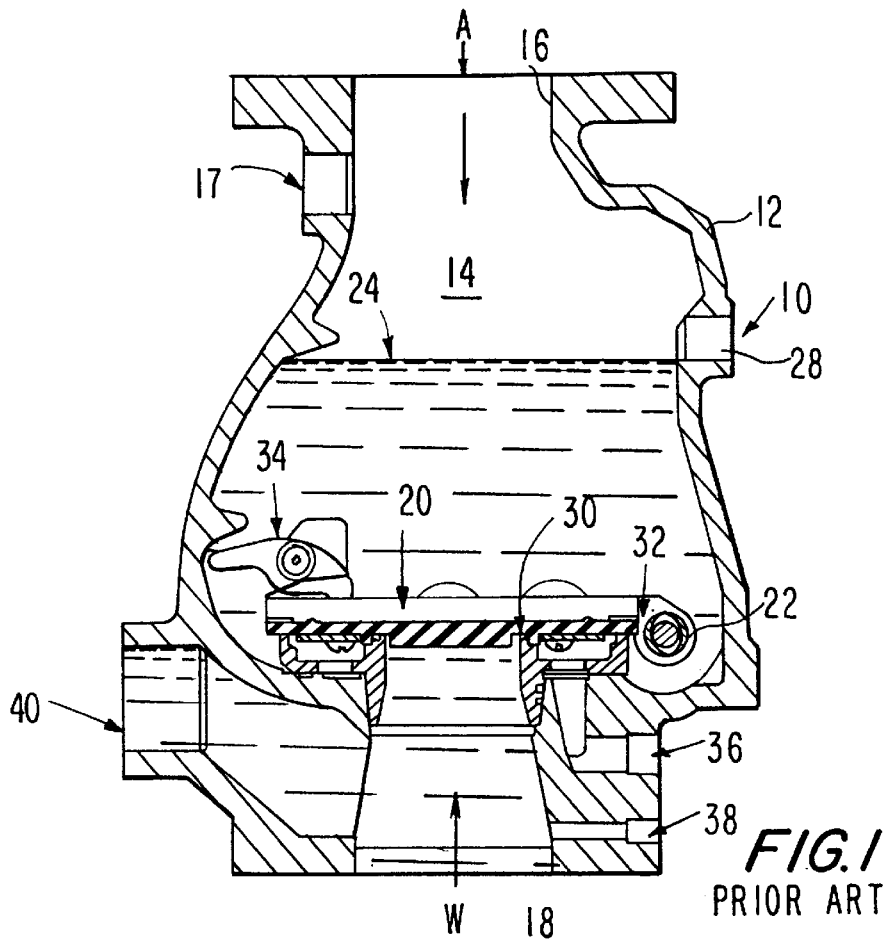
FIG. 1 is a cross-sectional view of a typical prior art check valve intended for a dry type fire control sprinkler system.

References initially made to FIG. 1 which shows a typical prior art check valve 10. Check valve 10 includes a housing 12 and interior chamber 14. An outlet 16 at one end of the housing is connected to the pressurized gas A of the fire control system, which may typically be air. The air under pressure is also present within the piping of the fire control system (not shown) which connects the check valve 10 to the plurality of sprinkler heads. The opposite end of the housing includes an inlet 18 which is connected to the pressurized water source. Located within the chamber 14 is a clapper 20 which pivots about 22. As is typically required in prior pressurized system check valves, a desired height of priming water 24 is introduced thereto through priming water inlet 28. The system air is supplied directly to the upper portion of the chamber and against the priming water through air inlet 17. The water seal for clapper 20 is provided at 30, with the air seal being at 32. Thus, it should be appreciated that the air pressure is applied to its seal 32 over a substantially greater area then the water pressure is applied to its seal 30. Hence this type of check valve is known as a high differential check valve, with the air seal being over a substantially greater area then the water seal to speed its operation in response to an air pressure drop. The clapper 20 is normally maintained in a closed condition by the equalization of the water and air pressures. Since the clapper will move to its open condition as a result of a differential reduction in the pressure seals, the increased area of the air seal requires a corresponding lower drop in pressure for the clapper to be activated, and moved clockwise about its pivot 22 to the open condition (not shown) than if both seals were of the same area. When the clapper moves to the open condition, water will then also flow through alarm outlet 36, which may be connected to a conventional water alarm (not shown). Likewise, an alarm test 38 is also provided to periodically check the proper functioning of the alarm. A drain opening 40 is also provided in the well known manner.

It should be appreciated that inasmuch as the clapper 30 is activated by the actual pressure differential sensed at the clapper, this check valve could inadvertently function should there be a sudden increase in water pressure, such as the condition known as a water hammer. Further, once some additional water enters the chamber 114, by virtue of some movement of the clapper which could partially release the water seal without opening the clapper, an increased head of water would then be present on the air side of the check valve. This would naturally increase the pressure applied to the clapper on the air side, necessitating a higher water pressure, which might not be readily available, to move the clapper to the open condition in the event there is a subsequent thermally responsive opening of one or more sprinkler heads.

Once the clapper opens and should there then be a reduction in water pressure, the clapper would then tend to return to its closed condition. In order to prevent this from occurring a mechanical latch 34 is usually provided for latching the clapper in its open condition. When the fire is then extinguished, the sprinkler heads are closed and the system drained. It is then necessary to obtain access to the interior of housing 12 in order to release the latch mechanism 34.

Figure 2:
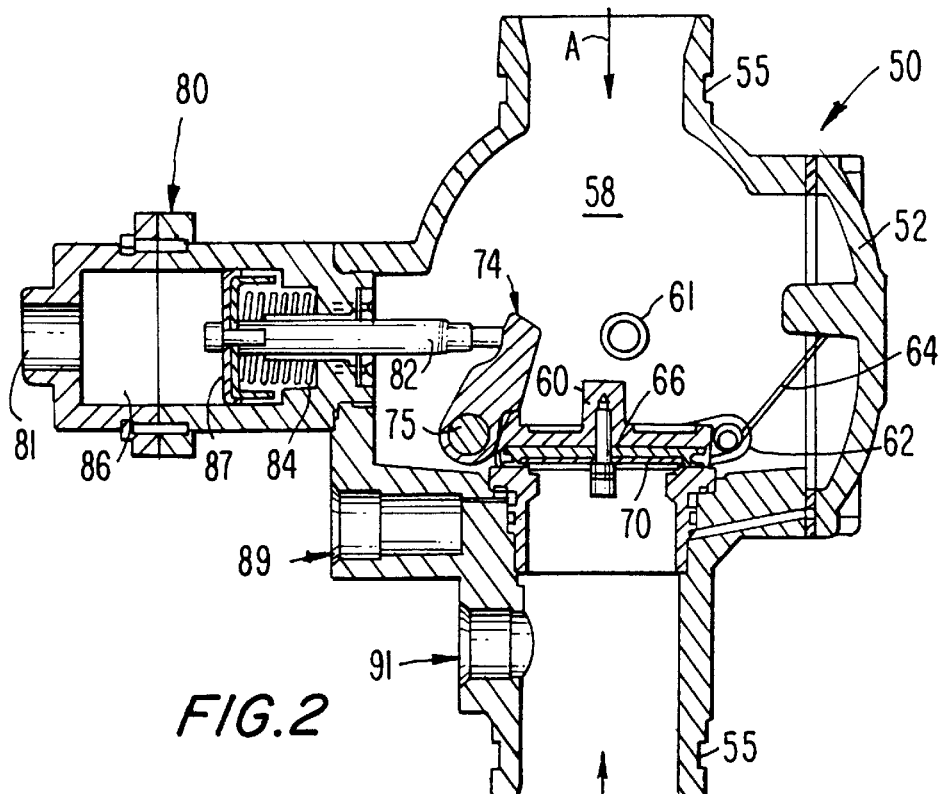
FIG. 2 is a cross-sectional view of the check valve of the present invention, shown in the closed condition.

References now made to FIGS. 2–5 which shows a preferred embodiment of the check valve in accordance with the present invention. The check valve 50 is contained within a housing 52. The housing is constructed of a high strength metallic material, which may be ductile iron. However, it should be understood that other materials and processes of manufacture can be used. For instance the housing 52 could be constructed of machined stainless steel or suitably molded plastic or other materials having the requisite strength. Inlet 61 is connected to the system pressurized air (or other inert gas). The housing 52 includes an outlet which is adapted to be connected to the sprinkler system piping. An inlet 56 at the opposite end of the housing is adapted to be connected to the source W of pressurized water. Both the inlet and outlet ends preferably include a groove 55 or flange (not shown) which is adapted the connected to a coupling in the well known manner, with such couplings being typically available from Victaulic Company of America, Easton, Pa. A chamber 58 is provided between the opposed inlets 54–56. A clapper 60 is pivotally mounted at 62 and biased by spring member 64. When the clapper 60 is in the closed condition, as shown in FIG. 2 it serves to isolate the pressurized water W from internal chamber 58, and the sprinkler system piping which will be connected to upper inlet 54.

Figure 5:
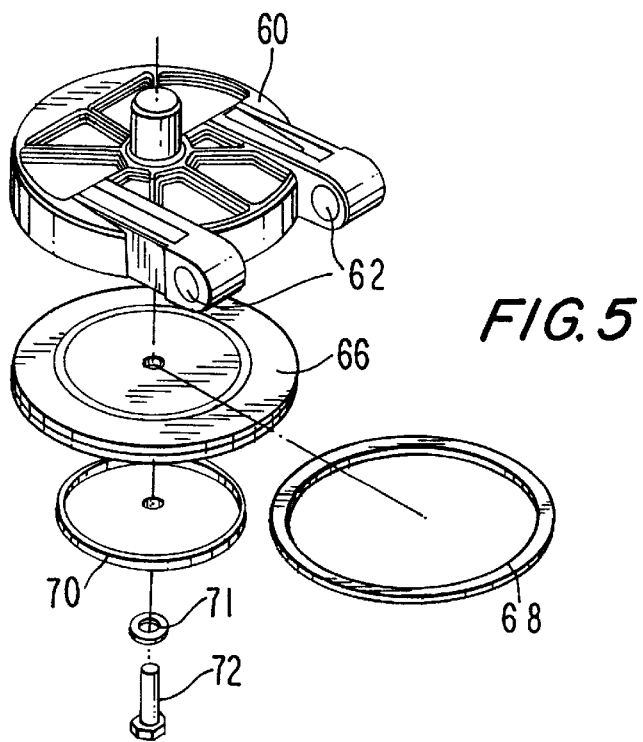
FIG. 5 is a exploded perspective view showing the components of the FIG. 4.
Figure 3:
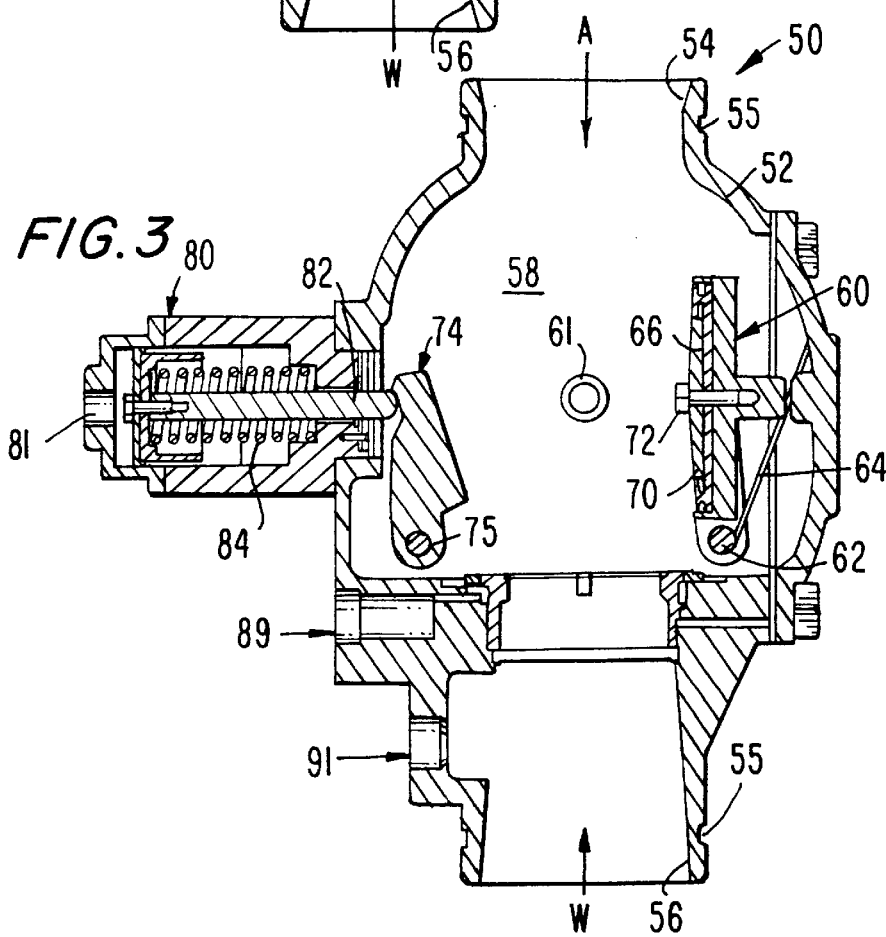
FIG. 3 is a cross-sectional view corresponding to FIG. 2, but showing the check valve in the open condition.
Figure 4:
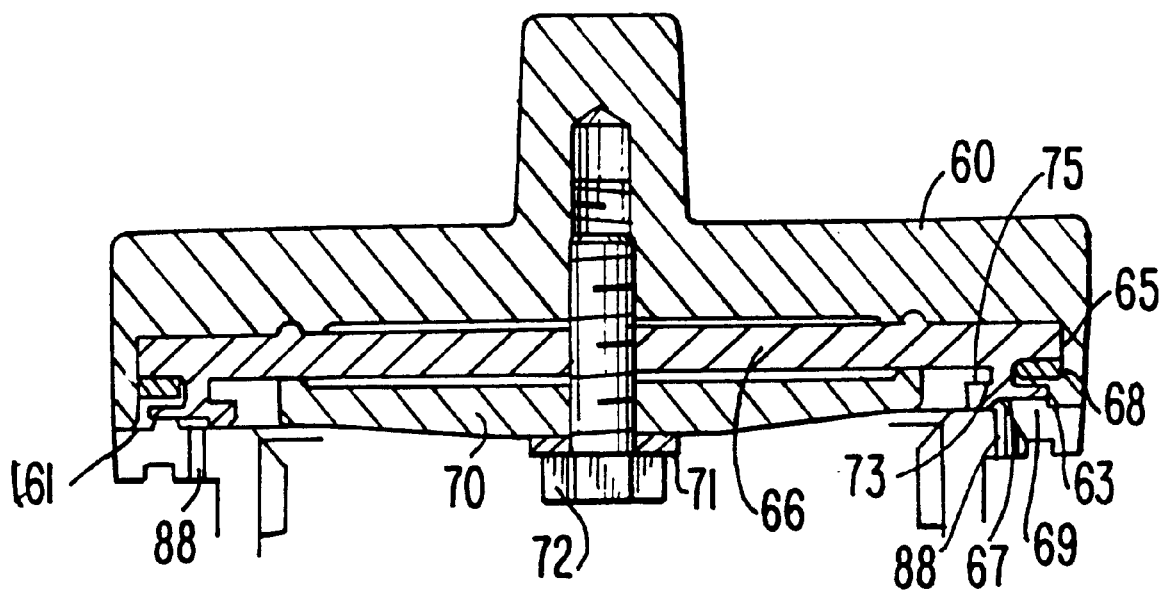
FIG. 4 is an enlarged view, showing the clapper and seal construction in the closed condition in FIG. 2.
Figure 7:
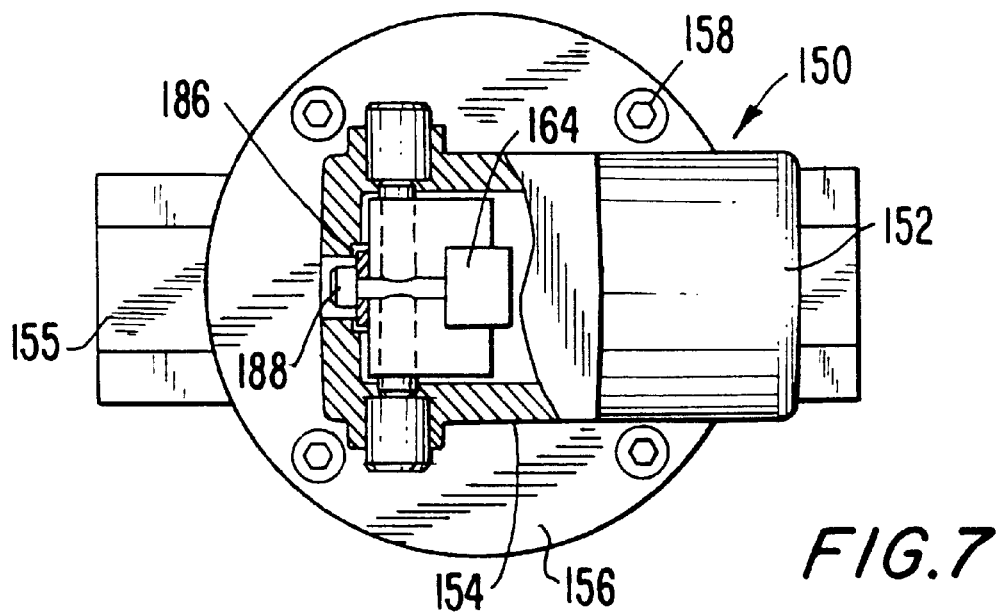
FIG. 7 is a top view, partially cut away, of the actuator shown in FIG. 6.
Figure 6:
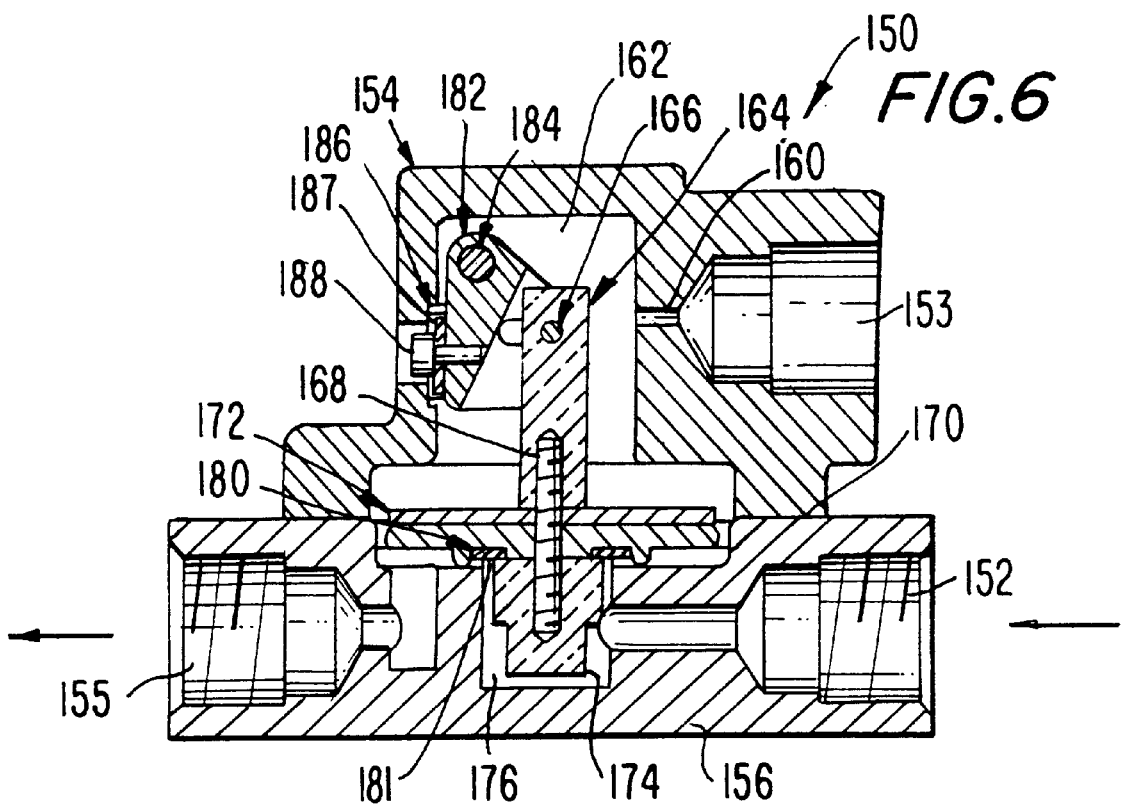
FIG. 6 is a cross-sectional view of one form of the actuator which is subject of a aforementioned U.S. patent application Ser. No. 09/080,879 entitled Actuator for a Check Valve.

As best shown in FIGS. 4 and 5, the clapper 60, which is preferably constructed of a metallic material, such as an aluminum bronze alloy, has an associated low differential sealing structure. The sealing structure includes a flexible diaphragm seal 66, preferably formed of rubber, a seal ring 68, which is preferably formed of a rigid plastic material, such as Delrin, and metallic seal plate 70, which may be formed of the same material as clapper 60. The diaphragm 66, sealing ring 68 and seal plate 70 are secured together by bolt 72, with intermediate washer 71 which mates with an internally threaded central aperture of the clapper 60. As shown in FIG. 2, the clapper 60 is maintained in its closed operative condition by a latch 74 which is pivoted about 75. The latch 74 is maintained in its latched condition by the piston assembly generally shown as 80. The piston assembly 80 includes a shaft 82 which is normally maintained in the position shown in FIG. 2, against the biasing force of expansion spring 84, by the system water pressure within its chamber 86 acting against head 87 of the piston assembly. As will subsequently be explained in conjunction with FIGS. 6 and 7, the loss of the system air pressure within the fire sprinkler piping, occasioned by the thermal actuation of sprinkler heads; when this occurs water will flow out of piston assembly chamber 86. This permits the shaft 82 of the piston assembly to move to the condition shown in FIG. 3. More specifically with the reduction of water pressure within chamber 86 the spring 84 moves the piston 82 resulting in the release of the latch 74. This allows the clapper 60 to move to its open operative condition about its pivot 62, as shown in FIG. 3. The depletion of the water within chamber 86 in response to the opening of sprinkler heads may typically be accomplished by the Actuator for Check Valve which is the subject of aforementioned Application Ser. No. 09/080,879 One form of such an actuator is shown in FIGS. 6 and 7, and will subsequently be described.

Referring back to the water and air pressure seals provided within the clapper 60, FIG. 4 shows that portion of the clapper structure in greater detail. Diaphragm 66 establishes two, radially proximate seals in association with the rigid platform 61 of the check valve housing 52. The pressurized air seal is provided by outermost flap 63 of the diaphragm which includes an upper surface 65 and lower surface 67. The pressurized air presented to the chamber 58 by the check valve inlet 61 is communicated to the narrow gap between the upper diaphragm surface 65 and seal retainer 68. This urges the flap 63 downward against an annular ridge 69 provided in the rigid platform 161. The water seal is provided by a downwardly projecting diaphragm ridge 73 which is at the inner extent of flap 63. The water pressure is applied against the upper surface 75 of the downwardly projecting ridge 73 to downwardly urge the diaphragm 73 in contact with a planer portion of the rigid platform 61 to provide the annular water seal. The annular air and water pressure seals preferably straddle a series of circumferentially spaced atmospheric openings 88. When the clapper moves to its open operative condition, with the diaphragm seals being defeated, the system water pressure will also flow through openings 88 which are in communication with alarm outlet 89. Water then flows out of alarm outlet 89 through a conventional type of water responsive signal means (not shown), typically referred to as a water motor alarm, which will provide an audible signal that the clapper has moved to its open operative condition as a result of the thermally responsive activation of the sprinkler system. An alarm test opening 91 is also provided in check valve 50. In the well known manner water is applied to alarm test opening 91 to actuate the alarm.

Though not intended to be limiting, the air seal provided by the engagement of diaphragm flap 63 and platform 69 may typically have an area of between 1.06 and 1.14 greater than the area of the water seal provided by diaphragm ridge 73 and the rigid platform of the housing, with a ratio of 1.14 being preferred. This area differential should be compared to the area differential between the air seal 32 and water seal 30 as shown in the prior art embodiment of FIG. 1, which is typically on the order of between 8:1 and 13:1. Accordingly, by virtue of this minimal area differential between the air and water pressure seals of the present invention, and the flexibility of the two seals, the present seal is able to advantageously adjust for greater tolerance variations than previously allowed, and permit some degree of clapper movement, which may be occasioned by variations in the system air and water pressure, while still maintaining the seals, and not resulting in movement of the clapper to its open operative condition. The clapper moves to the open operative condition of FIG. 3 only upon the release of the latch 74 by the piston assembly 80.

Figure 8:
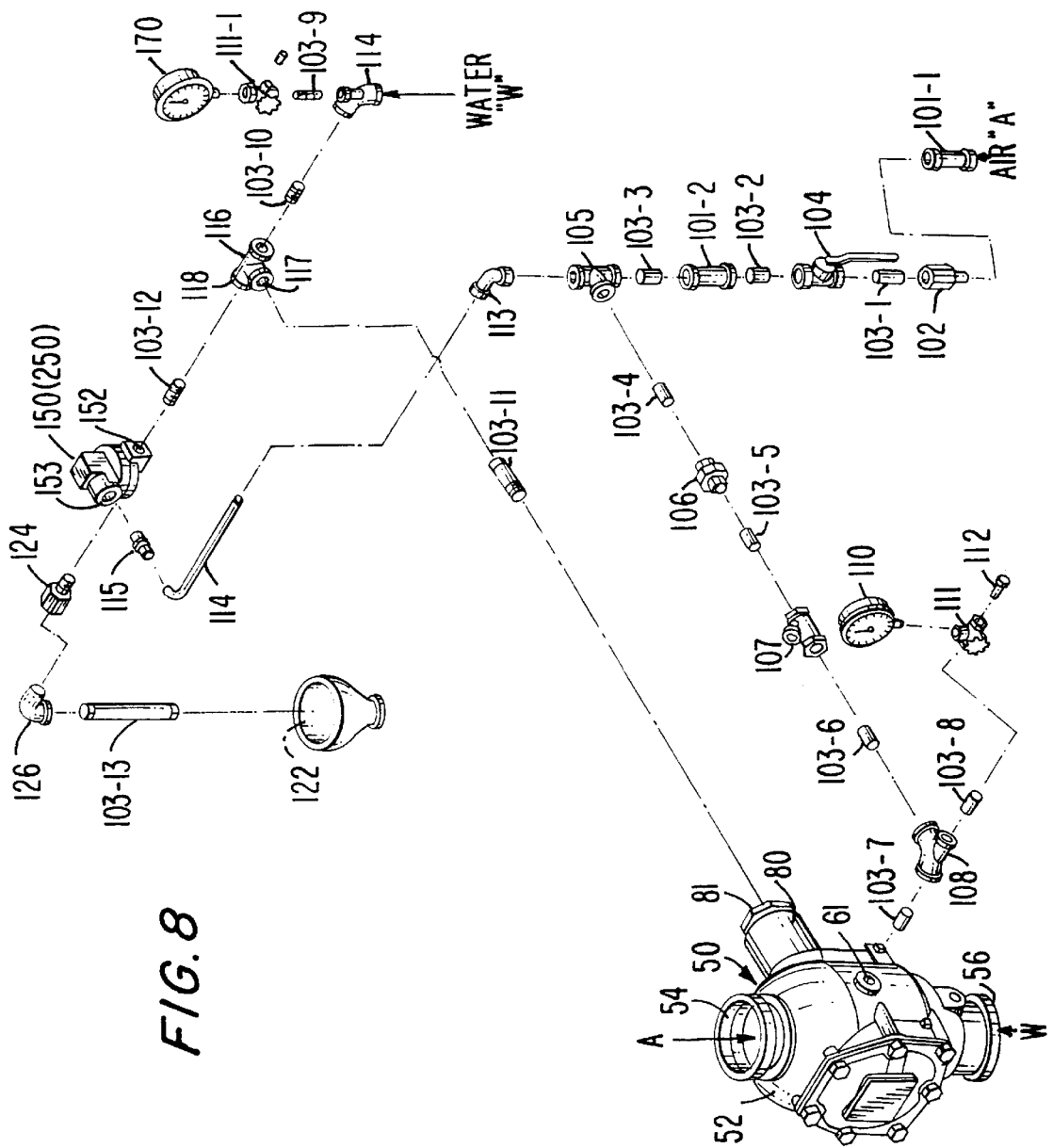
FIG. 8 is an exploded perspective view showing a portion of a typical dry fire control system utilizing the check valve of the present invention.

As shown in FIG. 8, the low differential check valve 50 of the present invention is connected to both the system air source A, (which is also connected to the sprinkler piping (not shown)) and system water pressure source W presented to its inlets 54, 56. The air pressure A is also typically connected to the inlet 61 of the check valve via connector 101-1 restricter 102, nipple 103-1, ball valve 104, nipple 103-2, connector 101-2, nipple 103-3 TEE, nipple 103-3, TEE connector 105, nipple 103-4, union 106, nipple 103-5, swing check valve 107, nipple 103-6, reducing TEE 108 and nipple 103-7. A supervisory switch not shown, may also be connected to an additional arm of connector 105. An air pressure gauge 110 is preferably also connected to reducing TEE 108 via nipple 103-8, nipple, TEE valve 111, with plug 112 being inserted in the terminus of the air pressure gauge line.

The air pressure gauge line is also simultaneously connected to input 153 of the actuator 150, of FIGS. 6 and 7, via elbow 113, tubing 114 and a compression fitting 115.

The system water pressure W is also simultaneously connected to both the check valve 50 and actuator 150. The water pressure W flows through reducing TEE 114 with one of its arms going to water pressure gauge 120 via nipple 103-9 and TEE valve 111-1. The other arm of the reducing TEE 114 is connected to TEE member 116 via nipple 103-10. One of the arms 117 is then connected to piston assembly inlet 81 of the low differential check valve, via nipple 103-11. The other arm 118 of the TEE connector 116 is connected to system water inlet 152 of the actuator 150 via nipple 103-12. As will subsequently be explained, the actuator 150 also includes a connection to drain 122 which is shown via restricter 124 elbow 126 and nipple 103-13. It should naturally be understood that the system connection shown in FIG. 8 is merely illustrative of a typical use of the low differential check valve 50 of the present invention and is not intended to be limiting.

Reference is now made to FIGS. 6 and 7 which show one form of the actuator 150 which is the subject matter of aforementioned Ser. No. 09/808,879, and may be utilized in conjunction with the differential check valve 50 of the present invention to provide for actuation of the plunger assembly 80. The actuator 150, which will be of substantially lesser size then the differential check valve 50, includes two-part housing 154, 156 connected by a plurality of bolts 158. The system air pressure at inlet 153 is presented through narrowed opening 160 to chamber 162. A vertically movable actuator shaft 164 is provided with an actuator pin 166 and a threaded rod 168 for receiving a diaphragm assembly 170 having a diaphragm retainer 172 at one side thereof. A dry actuator seal retainer 174 is at the lower most extent of the actuator pin 166. The system water pressure inlet 152 communicates with a lower chamber 176. The upper end of chamber 176 face seal 180 which provides a water seal between the dry seal actuator retainer 174 and projection 181 of the lower housing section 156. The air seal is provided by diaphragm 170, which will preferably be of the rolling diaphragm variety.

It should be readily appreciated that the air seal is provided over a substantially greater area than the water seal. This may typically be in the order of 8:1. Thus with this ratio, 1 psi of air will be an equilibrium with 8 psi of water. Should there be a reduction in the air pressure, the actuator shaft will rapidly move upward, with the differential pressure over the areas of the opposed seals being equal to the difference in actual pressure multiplied by the ratio (e.g. 8:1) between the areas of the high differential air and water seals. As the shaft moves upward the dry actuator seal retainer 174 allows water inlet 152 to communicate with outlet 155 which will be connected to the drain 122, shown in FIG. 8. This results in the water pressure in the piston assembly 80 of the check valve (to which inlet 152 is also connected) to be rapidly reduced. This allows the piston 82 of the differential check valve to move to the condition shown in FIG. 3, releasing latch 74, which then results in the clapper in the check valve 50 moving to its open operative condition. Thus the combination of the high differential actuator 150, in conjunction with the low differential check valve 50 results in a substantially smaller check valve, at a location away from the check valve differential seal, sensing the differential pressure, resulting from the actuation of a sprinkler head. To further speed the operation of the actuator 150, as actuator shaft 164 moves upward it engages cam 182 which is mounted on shaft 184. The rotation of cam 182 permits the opening of the upper chamber seal 186 which is connected to cam 182 by self tapping capscrew 188, with intermediate washer 187. The opening of the seal 186 will allow the air within the upper chamber 162 to be rapidly expelled. A particularly advantageous aspect of the differential actuator shown in FIGS. 6 and 7 is that it will be rapidly opened as soon as there is a slight change in the equilibrium between the applied air and water forces, to provide anti-flutter operation. This is to be contrasted to prior art dry actuators which experienced a tendency to open and close when subject it to slight variations in the air and water pressure which are insufficient to actuate the typical prior art valve as shown in FIG. 1. Further, such flutter would permit additional water to flow on the air side of the check valve, resulting in a water column which disadvantageously affects future operation and reliability of the check valve.

The opening of the upper chamber seal 186 advantageously prevents the reclosure once shaft 164 has been activated to engage cam 182, it being understood that when actuator 150 has been engaged pressurized air is still being applied to the system. Should the air pressure equalize the water force, actuator 150 could reclose. The opening of seal 186 also advantageously allows any water which may enter upper chamber 162 to be expelled. This will prevent water which would enter the upper chamber 162 upon operation of the actuator 150 from flowing into the air lines and possible incorrectly resetting diaphragm 170.

In a typical operation of the actuator unit shown in 150 their will be an 8:1 ratio between the area of the air seal and water seal. Accordingly, the unit will remain in the closed condition as shown in FIG. 6 as long as the air pressure does not drop to ⅛ of the water pressure. Typically, the air pressure in the non-activated dry fire control system will be in the order of 25 psi, with the system water pressure being in the order of 80 psi. Should the air pressure drop to just below 10 psi, occasioned by the thermally actuated opening of one or more sprinkler heads, the actuator unit 150 will then move to its open condition. This will open the passage between inlet 152 from the plunger assembly 80 of the dry actuator check valve, and outlet 155 to the drain 122. The draining of water from the chamber 86 of the assembly 80, results in its output shaft 82 moving to the condition shown in FIG. 3, thereby releasing the clapper latch 74, allowing clapper 60 to move to the open condition, with the result that the system water pressure is then applied to the piping system through the open sprinkler. The activation of the plunger assembly by controlling the water pressure in its chamber 86 advantageously provides more rapid operation than prior art systems which utilize air pressure as the control.

Accordingly, the low differential check valve of the present invention, which is pressurized in both directions by the system water and air pressure being applied to the unique flexible annular seal permits a substantial reduction in the volume and weight of the check valve, while permitting an increase in its rated pressure.

While the present invention has been disclosed with reference to a specific embodiment and particulars thereof, many variations should now be apparent to those skilled in the art. Accordingly, it is intended that the invention be described by the following claims:

What is claimed is:

1. A check valve comprising:
    a housing;
    an outlet at one end of said housing, said outlet adapted to be connected to a system containing a pressurized gas, with the pressurized gas being presented to said outlet;
    an inlet at the opposite end of said housing, said inlet adapted to be connected to a source of pressurized liquid, with the pressurized liquid being presented to said inlet;

a chamber between said outlet and inlet;
a clapper within said chamber at its juncture with said inlet, and selectively movable between closed and open operative conditions, said closed operative condition characterized as said clapper overlying the juncture between said chamber and inlet, whereby said clapper isolates said chamber and said outlet from the pressurized liquid at said inlet, and said open operative condition characterized as said clapper being moved away from the juncture between said chamber and said inlet, such that the pressurized liquid at said inlet may flow through said juncture, into said chamber and through said outlet into the system connected to said outlet;
sealing means for maintaining said clapper in said closed condition, said sealing means including first and second pressure seals, having first and second areas, respectively;
first conduit means communicating between said chamber and said first pressure seal for applying the pressurized gas at said outlet to the area of said first pressure seal, and second conduit means for applying the pressurized liquid at said inlet to the area of said second pressure seal;
said first and second pressure seals configured to be urged in the same sealing direction upon the application thereto of the pressurized gas and pressurized liquid;
said first and second pressure seals being in radial proximity, such that there is a minimal differential area between said first and second areas;
latch means within said chamber for maintaining said clapper in said closed condition;
latch release means operative independent of the pressure differential being applied at said first and second pressure seals, for releasing said latch to permit movement of said clapper to said open condition.

2. the check valve according to claim 1, wherein, the pressurized gas is air and the pressurized liquid is water.

3. The check valve according to claim 1, wherein said first and second pressure seals are annular flexible seals provided by the cooperative engagement of a unitary flexible diaphragm and a rigid platform of the check valve housing.

4. A check valve according to claim 1, wherein said clapper is automatically returned to its closed operative condition, after movement to its open operative condition, by sequentially changing the magnitudes of the pressurized gas at said outlet, and pressurized liquid at said inlet, without internally accessing the clapper.

5. A check valve according to claim 1, wherein said clapper is non-latched in its open operative condition.

6. A check valve according to claim 5, wherein said clapper is automatically returned to its closed operative condition, after movement to its open operative condition, by sequentially changing the magnitudes of the pressurized gas at said outlet, and pressurized liquid at said inlet, without internally accessing the clapper.

7. A check valve comprising:
a housing;
an outlet at one end of said housing, said outlet adapted to be connected to a system containing a pressurized gas, with the pressurized gas being presented to said outlet;
an inlet at the opposite end of said housing, said inlet adapted to be connected to a source of pressurized liquid, with the pressurized liquid being presented to said inlet;
a chamber between said outlet and inlet;
a clapper within said chamber at its juncture with said inlet, and selectively movable between closed and open operative conditions, said closed operative condition characterized as said clapper overlying the juncture between said chamber and inlet, whereby said clapper isolates said chamber and said outlet from the pressurized liquid at said inlet, and said open operative condition characterized as said clapper being moved away from the juncture between said chamber and said inlet, such that the pressurized liquid at said inlet may flow through said juncture, into said chamber and through said outlet into the system connected to said outlet;
sealing means for maintaining said clapper in said closed condition, said sealing means including first and second pressure seals, having first and second areas, respectively;
first conduit means communicating between said chamber and said first pressure seal for applying the pressurized gas at said outlet to the area of said first pressure seal, and second conduit means for applying the pressurized liquid at said inlet to the area of said second pressure seal;
said first and second pressure seals being in radial proximity, such that there is a minimal differential area between said first and second areas;
latch means within said chamber for maintaining said clapper in said closed condition;
latch release means operative independent of the pressure differential being applied at said first and second pressure seals, for releasing said latch to permit movement of said clapper to said open condition;
said first and second pressure seals are annular flexible seals provided by the cooperative engagement of a unitary flexible diaphragm and a rigid platform of the check valve housing; and
wherein said diaphragm includes an outermost flap having opposed upper and lower surfaces, said rigid platform including an annular ridge upwardly projecting towards said lower surface,
said first conduit applying the pressurized gas against said upper surface, to force said lower surface downward in sealing engagement with said annular ridge to form said first pressure seal.

8. The check valve according to claim 7, wherein said diaphragm includes a downwardly projecting ridge at the inner extent of said flap, and an annular gap above said ridge, said rigid platform including an annular planar surface inward of said annular ridge, and opposite said downwardly projecting ridge of said diaphragm,
said second conduit applying the pressurized liquid into said gap, to downwardly force said downwardly projecting diaphragm ridge in sealing engagement with said annular planar surface of said rigid platform to form said second pressure seal.

9. The check valve according to claim 8, further including a plurality of atmosphere openings circumferentially spaced about said rigid platform, radially between said first and second pressure seals.

10. The check valve according to claim 8, wherein the pressurized gas is air and the pressurized liquid is water.

11. The check valve according to claim 8, wherein, said latch release means is responsive to a change in the differential pressure between the pressurized gas and pressurized liquid sensed independent of the pressure differential at said first and second pressure seals.

12. The check valve according to claim 11, wherein
said latch release means includes a piston assembly including an output shaft;
said output shaft is moveable between first and second operative conditions, said first operative condition characterized as said shaft engaging said latch means and maintaining said latch means in a first position to maintain said clapper in its closed operative condition; and
said second operative condition characterized as said shaft releasing said latch means, whereby said latch means moves to a second position to permit said clapper to move to its open operative condition;
said output shaft is moveable from its first operative condition to its second operative condition in response to pressure differential between the pressurized gas and pressurized liquid as sensed at a location away from said clapper.

13. In a dry fire control sprinkler system, including a source of pressurized water for fire extinction, and pressurized gas within the sprinkler system piping,
a check valve having a first operative condition for isolating the pressurized water from the sprinkler system piping when the fire control sprinkler system is in a non-activated condition, and a second operative condition for permitting the pressurized water to flow into the sprinkler system piping when the fire control sprinkler system is in its activated condition;
said check valve comprising:
a housing;
an outlet at one end of said housing, said outlet adapted to be connected to the sprinkler system piping with the pressurized gas being presented to said outlet;
an inlet at the opposite end of said housing, said inlet adapted to be connected to the source of pressurized water, with the pressurized water being presented to said inlet;
a chamber between said outlet and inlet;
a clapper within said chamber at its juncture with said inlet, and selectively movable between closed and open operative conditions, said closed operative condition characterized as said clapper overlying the juncture between said chamber and inlet, whereby said clapper isolates said chamber and said outlet and the sprinkler system piping from the pressurized water at said inlet when the fire control system is in its non-activated condition, and said open operative condition characterized as said clapper being moved away from the juncture between said chamber and said inlet, such that the pressurized liquid at said inlet may flow through said juncture, into said chamber and through said outlet into the sprinkler system piping when the fire control system is in its activated condition;
sealing means for maintaining said clapper in said closed condition, said sealing means including first and second flexible pressure seals, having first and second sealing areas, respectively;
first conduit means communicating between said chamber and said first pressure seal for applying the pressurized gas at said outlet to the area of said first pressure seal, and second conduit means for applying the pressurized liquid at said inlet to the area of said second pressure seal;
said first and second pressure seals configured to be urged in the same sealing direction upon the application thereto of the pressurized gas and pressurized liquid;
said first and second pressure seals being in radial proximity, such that there is a minimal differential area between said first and second areas;
latch means within said chamber for maintaining said clapper in said closed condition;
latch release means operative independent of the pressure differential being applied at said first and second pressure seals, for releasing said latch to permit movement of said clapper to said open condition.

14. In a dry sprinkler system according to claim 13, wherein the pressurized gas is air.

15. In a dry sprinkler system according to claim 13, wherein said first and second pressure seals of the check valve are annular flexible seals provided by the cooperative engagement of a unitary flexible diaphragm and a rigid platform of the check valve housing.

16. In the check valve check valve for the dry sprinkler system of claim 13 wherein said clapper is non-latched in its open operative condition.

17. In the check valve for a dry fire control sprinkler system, including a source of pressurized water for fire extinction, and pressurized gas within the sprinkler system piping,
a check valve having a first operative condition for isolating the pressurized water from the sprinkler system piping when the fire control sprinkler system is in a non-activated condition, and a second operative condition for permitting the pressurized water to flow into the sprinkler system piping when the fire control sprinkler system is in its activated condition;
said check valve comprising a housing;
an outlet at one end of said housing, said outlet adated to be connected to the sprinkler system piping with the pressurized gas being presented to said outlet;
an inlet at the opposite end of said housing, said inlet adapted to be connected to the source of pressurized water, with the pressurized water being presented to said inlet;
a chamber between said outlet and inlet;
a clapper within said chamber at its juncture with said inlet, and selectively movable between closed and open operative conditions, said closed operative condition characterized as said clapper overlying the juncture between said chamber and inlet, whereby said clapper isolates said chamber and said outlet and the sprinkler system piping from the pressurized water at said inlet when the fire control system is in its non-activated condition, and said open operative condition characterized as said clapper being moved away from the juncture between said chamber and said inlet, such that the pressurized liquid at said inlet may flow through said juncture, into said chamber and through said outlet into the sprinkler system piping when the fire control system is in its activated condition;
sealing means for maintaining said clapper in said closed condition, said sealing means including first and second flexible pressure seals, having first and second sealing areas, respectively;
first conduit means communicating between said chamber and said first pressure seal for applying the pressurized gas at said outlet to the area of said first pressure seal, and second conduit means for applying the pressurized liquid at said inlet to the area of said second pressure seal;
said first and second pressure seals being in radial proximity, such that there is a minimal differential area between said first and second areas;

latch means within said chamber for maintaining said clapper in said closed condition;

latch release means operative independent of the pressure differential being applied at said first and second pressure seals, for releasing said latch to permit movement of said clapper to said first and second pressure seals f the check valve are annular flexible seals provided by the cooperative engagement of a unitary flexible diaphragm and a rigid platform of the check valve housing; and said diaphragm includes an outermost flap having opposed upper and lower surfaces, said rigid platform including an annular ridge upwardly projecting towards said lower surface; and said first conduit applying the pressurized gas against said upper surface, to force said lower surface downward in sealing engagement with said annular ridge, to form said first pressure seal.

18. In the check valve of the dry sprinkler system of claim 17, wherein said diaphragm includes a downwardly projecting ridge at the inner extent of said flap, and an annular gap above said ridge, said rigid platform including an annular planar surface inward of said annular ridge, and opposite said downwardly projecting ridge of said diaphragm, said second conduit applying the pressurized water into said gap, to downwardly force said downwardly projecting diaphragm ridge in sealing engagement with said annular planar surface of said rigid platform to form said second pressure seal.

19. In the check valve for the dry sprinkler system of claim 18, further including a plurality of atmosphere openings circumferentially spaced about said rigid platform, radially between said first and second pressure seals.

20. In the check valve for the dry sprinkler system of claim 18, wherein said first and second pressure seals are opened when said clapper is moved to its second operative condition.

21. In the check valve for the dry sprinkler system of claim 20, further including a plurality of atmosphere openings circumferentially spaced about said rigid platform, radially between said first and second pressure seals, the opening of said second pressure seal allowing the pressurized water at said second outlet to also flow into said atmosphere openings, the water flow into said atmosphere openings exiting from said check valve housing to activate an alarm.

22. In the check valve for the dry sprinkler system of claim 18, wherein, said latch release means is responsive to a change in the differential pressure between the pressurized gas and pressurized water sensed independent of the pressure differential at said first and second pressure seals.

23. In the check valve for the dry sprinkler system of claim 22, wherein said latch release means includes a piston assembly, including an output shaft;

said output shaft moveable between first and second operative conditions, said first operative condition characterized as said shaft engaging said latch means and maintaining said latch means in a first position to maintain said clapper in its closed operative condition, and said second operative condition characterized as said shaft releasing said latch means, whereby said latch means moves to a second position to permit said clapper to move to its open operative condition;

said output shaft moveable from its first operative condition to its second operative condition in response to pressure differential between the pressurized gas and pressurized water as sensed at a location away from said clapper.

24. In the check valve for the dry sprinkler system of claim 16, wherein said clapper is automatically returned to its closed operative condition, after movement to its open operative condition, by sequentially changing the magnitudes of the pressurized gas at said first inlet, and pressurized water at said second inlet, without internally accessing the clapper.

* * * * *